United States Patent
Furumoto et al.

(10) Patent No.: US 9,590,678 B2
(45) Date of Patent: Mar. 7, 2017

(54) MANAGING INPUT/OUTPUT PORTS IN MIXER SYSTEM USING VIRTUAL PORT DATA

(71) Applicant: Yamaha Corporation, Hamamatsu-Shi, Shizuoka-Ken (JP)

(72) Inventors: Yuki Furumoto, Hamamatsu (JP); Takao Yokoi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 54 days.

(21) Appl. No.: 14/501,737

(22) Filed: Sep. 30, 2014

(65) Prior Publication Data
US 2015/0092960 A1  Apr. 2, 2015

(30) Foreign Application Priority Data

Sep. 30, 2013  (JP) .................................. 2013-205336

(51) Int. Cl.
| H04B 1/00 | (2006.01) |
|---|---|
| H04B 1/20 | (2006.01) |
| H04H 60/04 | (2008.01) |

(52) U.S. Cl.
CPC ............. *H04B 1/207* (2013.01); *H04H 60/04* (2013.01)

(58) Field of Classification Search
CPC ........ H04B 1/207; H04H 60/04; G11B 27/34; G11B 27/034; G11B 27/028; G11B 27/038
See application file for complete search history.

(56) References Cited

U.S. PATENT DOCUMENTS

| 5,202,885 A * | 4/1993 | Schrodi ................... H04L 12/18 370/355 |
|---|---|---|
| 5,940,415 A * | 8/1999 | Li .......................... H03M 13/05 370/353 |
| 6,788,699 B1 * | 9/2004 | Yoshikawa ......... H04L 49/1553 370/417 |
| 2008/0215791 A1 * | 9/2008 | Aoki ...................... H04H 60/04 710/316 |
| 2008/0226099 A1 * | 9/2008 | Aiso ...................... H04H 60/04 381/119 |

(Continued)

FOREIGN PATENT DOCUMENTS

| JP | 2004-247898 A | 9/2004 |
|---|---|---|
| JP | 2012-204864 A | 10/2012 |

OTHER PUBLICATIONS

Notice of Grounds for Rejection (Office Action) mailed Dec. 22, 2015, for JP Patent Application No. 2013-205336, with English translation, eight pages.

*Primary Examiner* — Simon Sing
(74) *Attorney, Agent, or Firm* — Morrison & Foerster LLP (57) ABSTRACT

An I/O unit includes a plurality of ports, a mixer includes processing channels, and the mixer and the I/O unit are interconnected via a network. The mixer stores channel data per processing channel. The channel data includes virtual port data for indirectly controlling signal processing of a port to which the channel is patched. The I/O unit stores real port data for controlling a signal processing in a corresponding port per port. In response to a connection instruction, one port and processing channels are interconnected, and real port data of the one port connected with the processing channels is set to a value of virtual port data being maintained for the processing channels.

17 Claims, 6 Drawing Sheets

(56) References Cited

U.S. PATENT DOCUMENTS

| | | | |
|---|---|---|---|
| 2011/0019842 A1* | 1/2011 | Aoki | H04H 60/04 381/119 |
| 2011/0228955 A1* | 9/2011 | Fujita | H04H 60/04 381/119 |
| 2012/0250888 A1* | 10/2012 | Okabayashi | H04H 60/04 381/104 |
| 2013/0245799 A1* | 9/2013 | Terada | G06F 17/00 700/94 |

* cited by examiner

MANAGING INPUT/OUTPUT PORTS IN MIXER SYSTEM USING VIRTUAL PORT DATA

BACKGROUND

The present invention relates to an art which manages ports to be used, using virtual port data, in a mixer system including a plurality of ports which input and output audio signals (or video signals) and a plurality of processing channels which process the audio signals (or the video signals).

Conventionally, a digital mixer performs various signal processing such as mixing on a plurality of digital audio signals. The digital mixer includes a plurality of input ports, a plurality of input channels, a plurality of output channels and a plurality of output ports. The input channels are connected with desired input ports by input patch sections, and perform signal processing on audio signals input to the connected input ports. The output channels are connected with desired output ports by output patch sections, and the output patch sections supply audio signals, which have been signal-processed in the output channels, to the connected output ports. Each of signal processing functions of the digital mixer, including signal processing in the input ports, the input channels, the output channels and the output ports, is controlled by various parameters set by a human operator's operation to a user interface (also represented as "UI") of the digital mixer. In this specification, a series of the signal processing functions of the digital mixer, the UI for controlling them, etc. will be collectively referred to as "mixer system". For example, if a single digital mixer having an operation panel (UI) completes signal processing from input to output, the single digital mixer constitutes one "mixer system" by itself. Also, if a plurality of apparatuses including a console (UI) connected via an audio network share and perform signal processing from input to output, the plurality of apparatuses constitute one whole "mixer system". One example of such mixer system is disclosed in Japanese Patent Laid-Open Publication No. 2004-247898.

Each of the input and output ports (hereinafter referred to as "ports" if it is not necessary to distinguish these two types of parts) includes port data (e.g., gains, phases, delay time, etc.) which is a set of parameters to control sound properties of each of input and output audio signals. The conventional mixer system controls the port data of all the ports of equipment belonging to the mixer system, regardless of whether the individual ports are connected with the processing channels (i.e., whether participating in signal processing). As all the ports are configured to be occupied by one mixer system, some of the plurality of ports cannot be released for use from management of the mixer system. For example, some of the plurality of ports cannot be used for another mixer system, or two of the ports cannot be directly interconnected independently of management of the mixer system. In addition, in a mixer system having a plurality of apparatuses, if ports exceed processing channels in number, many of the ports remain unconnected. The conventional mixer system includes port data for remote control so that the console remotely controls the ports via the network. As the conventional mixer system is configured to control all the ports, it is necessary to prepare the port data for remote control in the console also for the ports unconnected with the processing channels. Hereinafter in this specification, setting values of parameters stored in a device for controlling behaviors of the device in response to a human operator's operation to a user interface of another device will be referred to as "remote control". Also setting values of parameters stored in a device for controlling behaviors of the device itself in response to a human operator's operation to a user interface of the device will be referred to as "local control".

SUMMARY OF INVENTION

In view of the above-described problems, the present invention has an object to, in a mixer system including a plurality of ports which input or output audio signals (or video signals) and a plurality of processing channels which process the audio signals (or the video signals), reduce restrictions on port use to improve usability. The present invention also has an object to reduce port data if the ports exceed the processing channels in number.

In order to accomplish the above-mentioned objects, the present invention is a computer-implemented method for managing a plurality of ports in a mixer system. The mixer system includes the plurality of ports, each of which is configured to input or output a signal and control the signal according to a parameter and a plurality of processing channels for processing the signals. The method includes: a step of maintaining, for each of the plurality of ports, real port data which is the parameter for controlling the signal; a step of maintaining, for each of the plurality of processing channels, virtual port data which defines the parameter for any one of the ports to be connected with the processing channel; a step of connecting, in response to a given connection instruction, between a selected one of the ports and a selected one of the processing channels; a step of setting, in response to the connection instruction, the real port data of the selected port connected with the selected processing channel to a value of the virtual port data maintained for the selected processing channel; and a step of accepting, for a particular one of the ports being connected with any of the processing channels, an operation to change a value of the real port data of the particular port.

According to the present invention, not only real port data which is parameters for controlling signals is maintained per port, but also, per processing channel, virtual port data which defines the parameters for any one of the ports to be connected with the processing channel is maintained. In response to a connection instruction for selecting any one of the ports and one of the processing channels and logically connecting between them, the real port data of the selected port connected with the selected processing channel is set to values of the virtual port data being maintained for the selected processing channel. In addition, with respect to a particular one of the ports being connected with any one of the processing channels, an operation to change values of the real port data of the particular port is accepted.

Thus, the real port data per port will have effectiveness in this mixer system while the port is being connected with any one of the processing channels. In other words, in this mixer system, the real port data may be managed only for the port being connected with the processing channel however many other ports are available. A virtual port peculiar to a processing channel deserves a non-conventional unique concept as it functions as a mediator for selective management of the real port data of each port. Thus, according to the present invention, the plurality of ports can be placed under management of the mixer system not collectively but selectively per port. This allows, for example, to use some of the plurality of ports for another mixer system, or directly interconnect two of the ports without being managed by the mixer system.

According to the present invention, when changing ports to be connected with a processing channel, virtual port data pertaining to the processing channel is automatically applied to the changed port, thereby allowing a human operator to continuously and efficiently operate the ports pertaining to the processing channel from before to after change. Therefore, the present invention advantageously allows to reduce restriction on port use and improves usability by controlling use and non-use of the ports per port in the mixer system. The present invention also has a superior effect to reduce port data in total if the ports exceed the processing channels in number.

In one embodiment, in response to the operation to change a value of the real port data, updating a value of the virtual port data for the processing channel being connected with the particular port to a changed value of the real port data may be further performed. In one embodiment, the given connection instruction may be given when a power source of the port or the processing channel is ON. In another embodiment, the given connection instruction may be given when a new port is found in the system. For example, if assuming a network-type mixer system, a port is newly found when an apparatus is newly detected op the network. In another embodiment, the given connection instruction may be given in response to a user's operation. In one embodiment, at least one of the plurality of ports may communicate with the plurality of processing channels via the network. In one embodiment, at least one of the plurality of ports may be included in input/output units configured to communicate with the plurality of processing channel via the network. In one embodiment, at least one of the plurality of ports may be included in other mixer systems configured to communicate with the plurality of processing channels via the network.

The present invention may be constructed and implemented not only as the method invention discussed above but also as a device invention. Also, the present invention may be arranged and implemented as a software program for execution by a processor, such as a computer or DSP, as well as a non-transitory computer-readable storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Hereinafter, one embodiment of a mixer system to which the present invention is applied will be described in detail with reference to the appending drawings.

Figure 1:
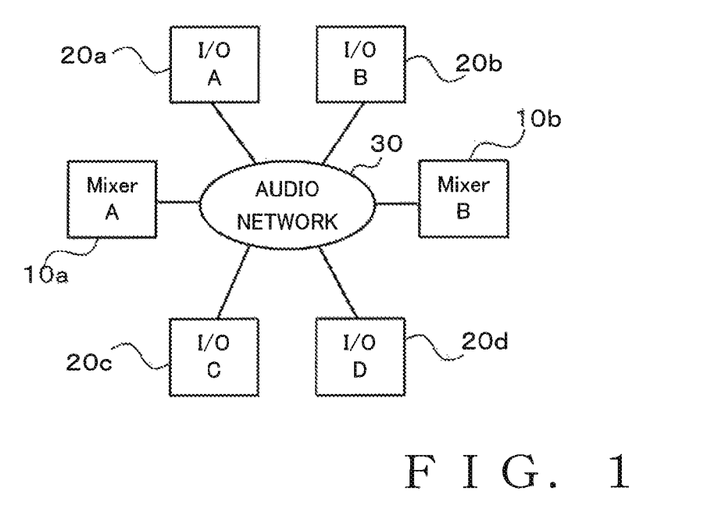
FIG. 1 is a block diagram showing an example configuration of one embodiment of a mixer system to which the present invention is applied.

FIG. 1 is a block diagram showing an example configuration of one embodiment of a mixer system to which the present invention is applied. In this mixer system, a plurality of (two in FIG. 1) mixing apparatuses ("mixers") 10 and a plurality of (four in FIG. 1) input/output units ("I/O units") 20 are connected with an audio network 30. Each of the I/O units 20 includes a plurality of input ports for inputting audio signals and/or a plurality of output ports for outputting audio signals. Each of the mixers 10 includes a plurality of processing channels for performing signal processing on audio signals.

In FIG. 1, reference numeral "10" is followed by alphabet characters "a" and "b" in order to distinguish each of the two mixers: "Mixer A" and "Mixer B" from the other, and reference numeral "20" is followed by alphabet characters "a", "b", "c" and "d" in order to distinguish each of the four I/O units: "I/O A", "I/O B", "I/O C" and "I/O D" from the others. In this specification, however, numerals "10" and "20" without any alphabet characters will be used if not necessary to distinguish individual apparatuses.

The mixers 10 and the I/O units 20 are interconnected, allowing to communicate data via the audio network 30. The audio network 30 is a network which can transmit various control data as well as a plurality of audio signals by time-multiplexing via a predetermined number of audio transmission channels such as 512 channels. For example, "EtherSound" (trademark), "Cobranet" (trademark), "Dante" (trademark), "AVB" (trademark), etc. can be used as the audio network 30. Note that "transmission channel" is equivalent to band for multiplexing and transmitting audio signals on the audio network 30, and different from "processing channel" having function of signal processing on audio signals.

One mixer system is constructed by one mixer 10 and one or more I/O units 20. The example of FIG. 1 has two independent mixer systems having two mixers 10a, 10b and one or more I/O units 20. Here, in the first mixer system (as will be discussed later, see FIG. 4), the mixer 10a performs signal processing, by UI operations thereof, on audio signals input and output to each port in the I/O units 20a, 20b and the mixer 10*b*. In the second mixer system (not illustrated in the figure), the mixer 10*b* performs, by UI operations thereof, signal processing on audio signals input and output to each port of the I/O units 20*b*-20*d*. The signal processing performed by the mixer 10*a* in the first mixer system and by the mixer 10*b* in the second mixer system are mutually independent.

The mixer 10 logically connects (hereinafter referred to as "to patch" as well) any one of the input ports of any one of the I/O units 20 to each of the processing channels by an input patch section to be described later, and performs signal processing in each of the processing channels on audio signals input from the outside via the logically-connected input port. Further, the mixer 10 logically connects a desired processing channel to each of the output ports of the I/O unit 20 by an output patch section to be described later, and each of the output ports outputs audio signals supplied from the processing channel connected with the port to the outside. Note that in this specification, "connection" (or "patching") means an operation to allocate one source of audio signals to one destination of audio signals in response to a patch setting operation (connection instruction) by a human operator, so that the audio signals can flow between the allocated source and destination. The destination receives the audio signals from the allocated source and performs processing thereon. While one source can be connected with a plurality of destinations, a plurality of sources cannot be connected with one destination.

Each port of the I/O unit 20 can be connected with either of the first and second mixer systems. While one input port can be simultaneously connected with both of the processing channels of the first and second mixer systems, port data of the input port can be remote-controlled only by either one of the mixer systems.

An output port unconnected with the processing channels of any one of the mixer systems can be connected with a desired input port of a desired I/O unit 20 (i.e., direct connection between the ports).

Each port of the I/O unit 20 can process audio signals according to parameters. Signal processing at an input port is, for example, gain control over audio signals and phase control (controlling whether phase inversion is made or not); and signal processing at an output port is, for example, gain control over audio signals and delay time. In the present invention, per processing channel of the mixer system, parameters for audio signal processing control at one port which should be connected (or has been connected) with the processing channel are maintained as "virtual port data"; and per port of the mixer system, parameters for audio signal processing control at the port are maintained as "real port data". And, when a connection instruction to connect any selected port to any selected processing channel is issued, real port data of the selected port is set to virtual port data being maintained for the selected processing channel.

Figure 2A:
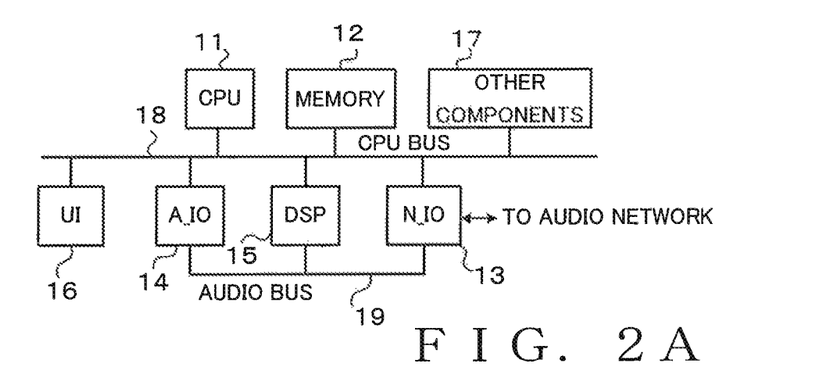
FIG. 2A is a block diagram showing an example configuration of electrical hardware of the mixer of FIG. 1.

FIG. 2A is a block diagram showing an example configuration of electrical hardware of the mixer 10. The mixer 10 includes a CPU (processor unit) 11, a memory 12, a network interface 13 ("N_IO"), an audio interface 14 ("A_IO"), a digital signal processor (DSP) 15 and a user interface (UI) 16, which are interconnected via a CPU bus 18. The N_IO 13, the A_IO 14 and the digital signal processor (DSP) 15 are interconnected via an audio bus 19. The audio bus 19 transmits digital audio signals between any ones of a plurality of connected blocks.

The CPU 11 executes control programs stored in the memory 12 and controls general behavior of the mixer 10. The memory 12 can be constructed by appropriately combining memory means such as a ROM, a RAM, a flash memory, a HDD, etc. In the memory 12, channel data per processing channel to be mentioned later and port data per port provided by the mixer 10 are stored, together with various programs including control programs necessary for behaviors of the mixer 10.

The mixer 10 is connected with the audio network 30 via the N_IO 13. The N_IO 13 is an interface for connecting the mixer 10 with the audio network 30, performing operations such as receiving one or more audio signals and various control data from another equipment connected with the audio network 30 and transmitting one or more audio signals and various control data to another equipment connected with the audio network 30.

The A_IO 14 is an audio interface including a plurality of input ports, each of which receives analog or digital audio signals from external equipment and, after converting them into digital audio signals for signal processing in the mixer 10 as needed, outputs them to the audio bus 19; and/or a plurality of output ports, each of which converts the digital audio signals supplied from the audio bus 19 into analog or digital audio signals for external equipment and outputs them thereto. The A_IO 14 is connected with audio input and/or output equipment as external equipment, which is not illustrated in the figure. The mixer 10 receives the audio signals via the input ports from the external equipment (e.g., microphone, electronic equipment, recorder, etc.), and supplies the audio signals via the output ports to the external equipment (e.g., power amplifier, recorder, powered speaker, etc.).

The digital signal processor (DSP) 15 receives one or more audio signals via the audio bus 19 from the N_IO 13 or the A_IO 14, performs digital signal processing on the received audio signal(s) per processing channel by executing programs for signal processing, and supplies the thus-processed audio signal(s) via the audio bus 19 to the N_IO 13 or the A_IO 14. Digital signal processing (audio processing) performed by the DSP 15 includes routing (including patch setting to be described later) of audio signals, regulating sound properties (sound volume level and tone quality), mixing processing for mixing a plurality of audio signals, effect processing on audio signals (imparting effect), etc. Parameters, etc. which control signal processing at each processing channel performed by the DSP 15 are stored in the memory 12 as channel data per processing channel. Parameters which control signal processing at each port of the A_IO 14 are stored in the memory 12 as real port data per port. Values of channel data and real port data are changed according to value change operations by a human operator using the UI 16.

The mixer 10 is provided with the UI 16 including a large number of operators and display sections (or displays) arranged on an operation panel. The operators on the operation panel include a plurality of fader operators arranged per channel strip (operation section per channel), rotary-type operators, button switches, etc. The display sections on the operation panel are, for example, liquid-crystal displays, displaying various information such as values of parameters and patch settings and accepting settings of various displayed information. The configuration of the mixer 10 shown in the figure is one example, and accordingly may include other components 17. Alternatively, DSP 15 and/or UI 16 in the mixer 10 may be provided separately from other apparatuses of the mixer 10.

Figure 2B:
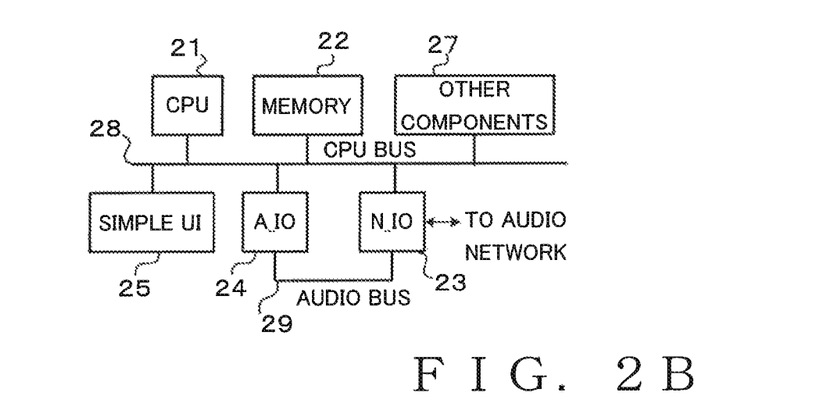
FIG. 2B is a block diagram showing an example configuration of electrical hardware of the I/O units of FIG. 1.

FIG. 2B illustrates an example configuration of electrical hardware of the I/O unit 20. The I/O unit 20 includes a CPU 21, a memory 22, an N_IO 23, an A_IO 24, a UI 25 and other components 27, which are interconnected via a CPU bus 28, and further the N_IO 23 and A_IO 24 are interconnected via an audio bus 29.

The CPU 21 executes control programs stored in the memory 22 and controls general behaviors of the I/O unit 20. The memory 22 can be constructed by appropriately combining memory means such as a ROM, a RAM, a flash memory, a HDD, etc. In the memory 22, control programs for controlling behaviors of the I/O unit 20 and real port data to be mentioned later are stored. Similar to the N_IO 13 of the mixer 10, the N_IO 23 is a network interface which allows to transmit a plurality of audio signals and control data. The UI 25 is a user interface which is simpler than the UI 16 of the mixer 10, including, for example, several operators and a display section for displaying around ten letters.

The A_IO 24 is an audio interface similar to the above-described A_IO 14. The I/O unit 20 transmits audio signals received from external equipment via the A_IO 24 to another equipment connected with the audio network 30 via the N_IO 23, and/or outputs the audio signals, which are received from another equipment connected with the audio network 30, to external equipment via the A_IO 24.

Figures 3A, 3B:
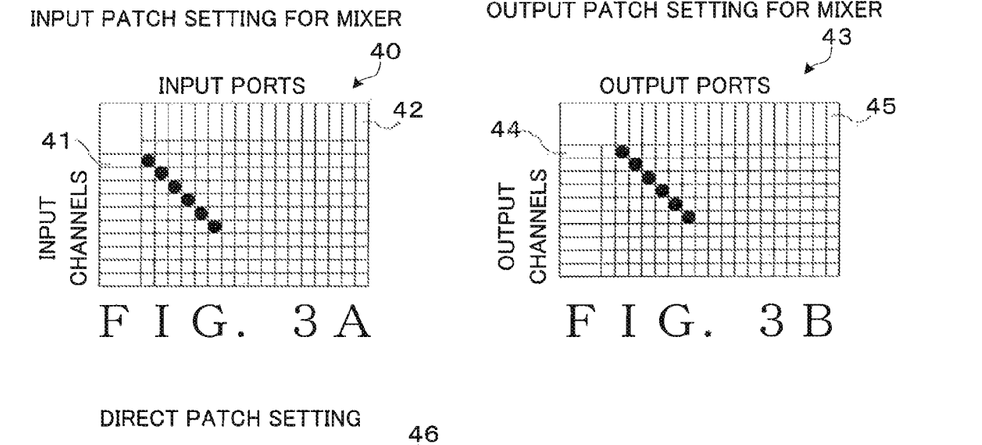
FIG. 3A is a view explanatory of an input patch setting screen of the mixer.
FIG. 3B is a view explanatory of an output patch setting screen of the mixer.
Figure 3C:
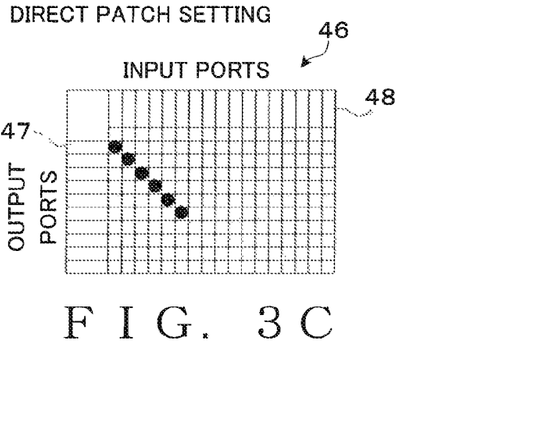
FIG. 3C is a view explanatory of a patch setting screen of the I/O unit.

FIG. 3A is a view showing one example of an input patch setting screen 40 of the first mixer system; FIG. 3B is a view showing an output patch setting screen 43 of the first mixer system; and FIG. 3C is a view showing a direct patch setting screen 46 outside the mixer system. These patch setting screens 40, 43, 46 are displayed on the display sections included in the UI 16 of the mixer 10 in response to instructions by a human operator. The human operator performs a desired patch setting from a desired patch setting screen.

Each of the patch setting screens 40, 43, 46 is constructed by a matrix having sources and destinations of audio signals, and can set a patch from one source to one destination by setting a joint mark (indicated by a "●" mark in the figure) at an intersecting point between the one source and the one destination. The mixer 10 controls patch sections 220*a*, 220*b*, 230*a*, 230*b* of the I/O units, patch sections 120*b*, 130*b* of the mixer 10*b*, and an input patch section 100 and an output patch section 108 of the mixer 10*a*, on the basis of patch setting operations (connection instructions by a user) performed on the patch setting screens 40, 43, 46.

The input patch setting screen 40 of the first mixer system shown in FIG. 3A is a screen for setting connections between the input ports and the input channels of the first mixer system. Hereinafter, a processing channel which performs digital signal processing on an audio signal input to the mixer system will be referred to as "input channel". The input patch setting screen 40 displays all the input channels (destinations) provided in the first mixer system on a vertical axis 41 (column) and all the input port (sources) connectable with the input channels of the first mixer system on a horizontal axis 42 (*row*), allowing to set connections between desired input channels and desired input ports. Note that each of the input ports and output ports is set either to be "occupied" for a mixer system or direct connection, or to be "shared" by a plurality of mixer systems and/or direct connections, which is not described in detail. On one hand, for example, a port set so as to be "occupied" by a mixer system cannot be set to be connected by another mixer system than the mixer system. On the other hand, a port set to be "shared" can be set to be connected by each mixer system or direct connection. The input patch setting screen 40 of the first mixer system should display input ports set to be "occupied" for the first mixer system of all the input ports of each apparatus connected to the network 30, and input ports set to be "shared" and unpatched (i.e., unconnected) by other mixer systems or direct connections. These input ports are currently not under control of the other mixer systems, but are ones which allow patch settings by the first mixer. In the case of the first mixer system, the input channels displayed on the vertical axis 41 are all the input channels provided in the mixer 10*a*, whereas input channels provided in another mixer system (e.g., input channels of the mixer 10*b* included in the second mixer system) are not displayed thereon.

The output patch setting screen 43 of the first mixer system shown in FIG. 3B is a screen for setting patching from the output channels to the output ports of the first mixer system. Hereinafter, a processing channel which performs digital signal processing on an audio signal output from a mixer system will be referred to as "output channel". The output patch setting screen 43 displays all the output channels (sources) provided in the first mixer system on a vertical axis 44 (column) and all the output ports (destinations) connectable with the output channels of the first mixer system on a horizontal axis 45 (row), allowing to set connections between desired output ports and desired output channels. The input patch setting screen 43 of the first mixer system should display output ports set to be "occupied" for the first mixer system of all the input ports of each apparatus connected with the network 30, and output ports set to be "shared" and unpatched (i.e., unconnected) by other mixer systems or direct connections. These output ports are currently not under control of the other mixer systems, but are ones which allow patch settings by the first mixer. In the case of the first mixer system, the output channels displayed on the vertical axis are all the output channels provided in the mixer 10*a*, whereas output channels provided in another mixer system (e.g., output channels of the mixer 10*b*) are not displayed.

The setting screen 46 for direct patch outside any mixer systems shown in FIG. 3C is a screen for setting patching (i.e., direct connection) from input ports of an I/O unit 20 to output ports of another I/O unit 20. The direct patch setting screen 46 displays, on a vertical axis 47 (column), output ports set to be "occupied" for direct connections and output ports set to be "shared" and unconnected by any mixer systems, of all the output ports (destinations) of all the apparatuses connected with the audio network 30, and on the horizontal axis 48 (row), input ports set to be "occupied" for direct connections and input ports set to be "shared" and unconnected by any mixer systems, of all the input ports (sources) of all the apparatuses connected with the audio network 30, allowing to set connections between desired output ports and desired input ports.

Figure 4:
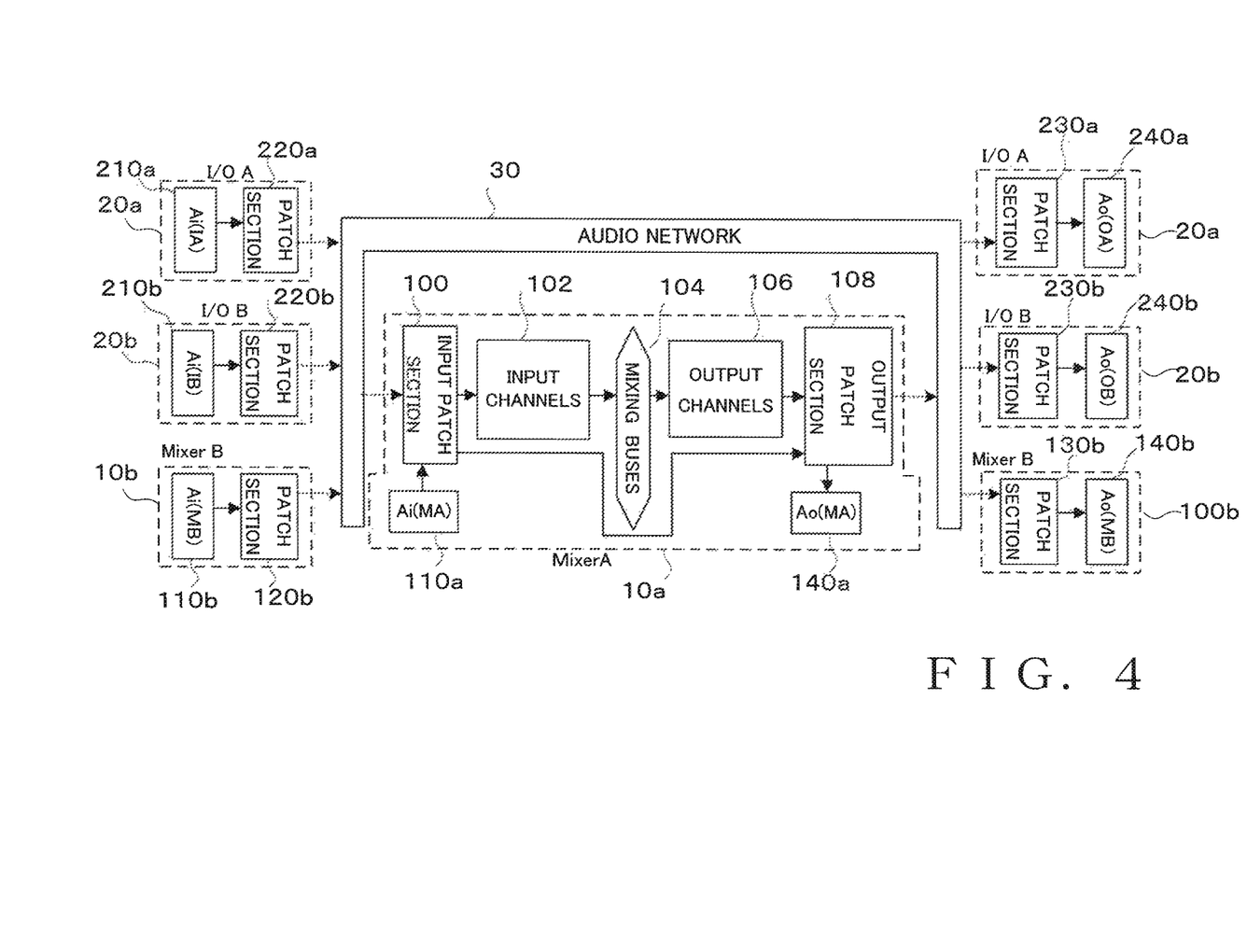
FIG. 4 is a block diagram explanatory of a signal processing flow in the mixer system of FIG. 1.

FIG. 4 is a block diagram illustrating one example of a flow of signal processing in the mixer system shown in FIG. 1. The digital signal processing illustrated in FIG. 4 is constructed on the assumption that the mixer 10*a* ("Mixer A") plays a key role to perform signal processing such as mixing processing on a plurality of audio signals input via a plurality of input ports of the I/O units 20*a* ("I/OA"), 20*b* ("I/OB") and the mixers 10*a*, 10*b* ("Mixer B"), and then outputs the plurality of thus-processed audio signals to a plurality of output ports of the I/O units 20*a*, 20*b* and the mixers 10*a*, 10*b*. Note that in the audio network 30 of FIG. 1, not only the mixer 10*a* shown in this FIG. 4, but also the mixer 10*b* plays a key role to perform audio processing (not shown in the figure) of the second mixing system.

Each of the I/O units 20*a*, 20*b* and the mixers 10*a*, 10*b* inputs audio signals from the outside via one or more input ports 210*a* ("Ai (IA)"), 210*b* ("Ai (IB)"), 110*a* ("Ai (MA)"), 10*b* ("Ai (MB)"). The input ports 210*a*, 210*b*, 110*a*, 110*b* correspond to the A_IOs 14, 24 of FIGS. 2A, 2B, and each of the ports performs, according to corresponding real port data, processing to control gains and phases of the audio signals input from the outside. On the basis of a patching (connection) set for each input port (i.e., source) provided by an apparatus on the patch setting screen 40, 46, the patch section 220*a*, 220*b*, 120*b*, 100 of the apparatus supplies an audio signal of the input port to a destination corresponding to the patching. Namely, if a particular destination of a particular patching set to a particular input port of a particular apparatus is a processing channel or an output port in the same apparatus, the corresponding patch section 220*a*, 220*b*, 120*b* or 100 of the particular apparatus directly supplies an audio signal of the particular input port. On the other hand, if a particular destination of a particular patching set to a particular input port of a particular apparatus is an output port in another apparatus, the corresponding patch section 220*a*, 220*b*, 120*b* or 100 of the particular apparatus supplies an audio signal of the particular input port to the other apparatus via the audio network 30, using an audio transmission channel ready secured by the apparatus.

Note that the I/O units 20*a*, 20*b* and the mixers 10*a*, 10*b* previously secure audio transmission channels whose number is designated by a human operator for the apparatus from among a predetermined number of audio transmission channels in the audio network 30, whereby for a patch setting for supplying the audio signal via the audio network 30, the audio signal of each patched input port (source) is to be allocated to any one of the secured audio transmission channels. And the N_IO 13, 23 of each apparatus transmits the audio signal allocated to the audio transmission channel from the source, using the audio transmission channel of the audio network 30. In addition, the N_IO 13, 23 of each apparatus notifies transmission information indicative of the audio transmission channel and the source thereof to other apparatuses of the audio network 30.

On the basis of each patching (connection) set on the patch setting screen 40, 43, 46 and the transmission information from the other apparatuses, the mixer 10*a* identifies an audio transmission channel which should receive an audio signal from among the audio transmission channels of the audio network 30, and sets the N_IO 13 so as to receive the identified audio transmission channel. The N_IO 13 receives an audio signal of each set audio transmission channel from among the plurality of audio transmission channels of the audio network 30. The input patch section 100 supplies an audio signal from a source to an input channel 102 (destination), on the basis of each patching (connection) set on the patch setting screen 40, 43, 46. Namely, if a source in a set patching is the input port 110*a* in the mixer 10*a*, the input patch section 100 supplies an audio signal of the input port 110*a* to the input channel 102 which is a destination in the patching. If a source in a set patching is one in another apparatus, the input patch section 100 supplies an audio signal of the source received by the N_IO 13 to the input channel 102 which is a destination in the patching.

The mixer 10*a* includes the plurality of input channels 102. Each of the input channels 102 receives an audio signal from each connected input port, performs signal processing such as controlling a compressor, an equalizer, sound volume, etc., and selectively outputs the thus-processed audio signal to each bus line of mixing buses 104. The mixing buses 104 having a plurality of bus lines mixes audio signals supplied from one or more input channels 102 per bus line and output to corresponding output channels 106. The mixer 10*a* includes a same number of the output channels 106 as a number of the mixing buses 104. Each of the output channels 106 performs signal processing such as a compressor, an equalizer, sound volume control, etc. on an audio signal output from a corresponding one of the mixing buses 104. Note that the input channels 102, the mixing buses 104 and the output channels 106 are realized by the DSP 15 of the mixer 10.

The output patch section 108 supplies an audio signal of one output channel to a destination, on the basis of each patching (connection) set on the output patch setting screen 43. For example, if a destination of a particular patching set to a particular output channel 106 is an output port in another apparatus, an audio transmission channel ready-secured by the mixer 10*a* is allocated to the audio signal output by the output channel 106. The N_IO 13 transmits the audio signal to which each audio transmission channel is allocated, using the audio transmission channel of the network 30. In addition, transmit information indicative of the audio transmission channel and the source is notified to other apparatuses connected with the audio network 30.

On the basis of each patching set on the patch setting screen 43, 46 and the transmit information from the other apparatuses, the I/O unit 20*a*, 20*b* and the mixer 10*b* identify an audio transmission channel of the audio network 30 which should receive the audio signal, and then set it to the N_IO 13, 23. The N_IO 13, 23 receives the audio signal of each set audio transmission channel from the audio network 30. Then, the patch section 230*a*, 230*b*, 130*b* (and 220*a*, 220*b*, 120*b*) of each apparatus supplies, on the basis of a patching (connection) set on the patch setting screen 43, 46 for each output port (destination) provided by the apparatus, an audio signal of a source corresponding to the patching to the output port. Namely, if a source of a particular patching set to a particular output port of a particular apparatus is an input port or a processing channel in the same apparatus, the patch section 230*a*, 230*b*, 130*b* (and 220*a*, 220*b*, 120*b*) of each apparatus supplies the audio signal of the input port or the processing channel to the output port; and if it is a source in another apparatus, it supplies an audio signal of the source received by the N_IO 13, 23 to the output port.

The I/O units 20*a*, 20*b* and the mixers 10*a*, 10*b* output audio signals to the outside from one or more output ports 240*a* ("Ao (OA)"), 240*b* ("Ao (OB)"), 140*a* ("Ao (MA)") and 140*b* ("Ao (MB)") of each of the units and the mixers. The output ports 240*a*, 240*b*, 140*a*, 140*b* correspond to the A_IOs 14, 24 of FIGS. 2A and 2B; and each of the output ports performs processing to control gains and delay time of the audio signal output to the outside according to corresponding real port data.

It should be noted that the patch section 210*a*, 210*b*, 230*a*, 230*b* of each I/O unit 20, the patch sections 110*b*, 130*b* of the mixer 10*b*, and the input patch section 100 and the output patch section 108 of the mixer 10*a* can be realized by a configuration which realizes a patch section in cooperation with each bloc connected via the audio bus 19, 29 of each apparatus (the N_IO 13, the A_IO 14 and the DSP 15, or the N_IO 23 and the A_IO 24), or by a configuration which provides hardware exclusive for patching to the network I/O 13, 23 of each apparatus, etc. As a mixer system, the input patch section 110 and the output patch section 108 of the mixer 10 are functionally equivalent to the patch section of each I/O unit 20. Therefore, the mixer 10 may be configured to behave as the I/O unit 20 by continuously supplying power to the local ports 110, 120, the input patch section 100, the output patch section 108 and the N_I/O 13 (serving functions to control audio signal paths) of the mixer 10 during off-power, but turning off the power source of the other sections (serving signal processing functions).

Figure 5:
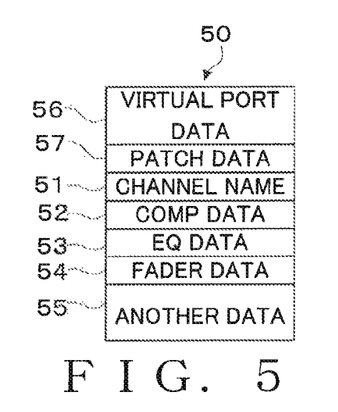
FIG. 5 is a view explanatory of a data formation of channel data.

FIG. 5 is a diagram explanatory of one example of data formation of channel data 50 per processing channel stored in the memory 12 of the mixer 10. Each of the plurality of processing channels (i.e., the input channels and output channels) provided in the mixer 10 has a channel ID (abbreviated as "ch_ID") for identifying the processing channel, and channel data prepared for each of the processing channels is also identified by the ch_ID. Channel data 50 for one processing channel includes virtual port data 56 and patch data 57, for example, in addition to a channel name 51 which is a designation given by a human operator and various kinds of data 52-55 which control signal processing of the channel. Note that the configuration to store the virtual port data 56 per processing channel in the memory 12 is equivalent to a second memory section configured to maintain, for each of the plurality of processing channels, the virtual port data defining the parameters for any one of the ports which should be associated with the processing channel.

A virtual port is a concept peculiar to a processing channel; namely any real port patched to the processing channel is identified as the one virtual port peculiar to the processing channel. Virtual port data 56 is various parameters for controlling audio signal processing, etc. prepared for such virtual port peculiar to the processing channel. The virtual port data 56 does not directly control audio signal processing at a particular port. Instead, by mean of setting real port data of the particular port to a value of the virtual port data 56, the audio signal processing, etc. at the particular port can be indirectly controlled by the virtual port data 56. The virtual port data 56 included in channel data 50 of an input channel is a parameter set for input port control, and the virtual port data 56 included in channel data 50 of an output channel is a parameter set for output port control. Virtual port data is generally equivalent to port data for remote control in the conventional mixer system. But, the virtual port data is different from the conventional port data in that the conventional port data is prepared for all ports irrelevant to processing channels, whereas the virtual port data of the present invention is prepared for ports patched to processing channels.

Patch data 57 is data which defines patching involving a processing channel thereof, and has values in accordance with patch setting of the processing channel set on the above-mentioned patch setting screen in FIGS. 3A and 3B. Namely, in channel data 50 of one input channel identified by a ch_ID, an ID (p_ID) of one input port patched to the input channel is included as patch data 57. Further, in channel data 50 of one output channel identified by a ch_ID, an ID (p_ID) of one output port patched to the output channel is included as patch data 57.

Each of various data 52-55 which is used for signal processing in a processing channel has one or more parameters including, for example, data for a compressor (Comp data) 52, data for an equalizer (EQ data) 53 and data for sound volume control 54 (fader data). In addition, other data 55 including parameters of panning for defining LR localization, etc. may be included in the channel data 50. The various data 52-55 of the channel data 50 is parameters which control a signal processing in each processing channel performed by the DSP 15.

Figure 6:
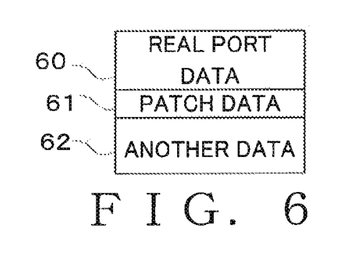
FIG. 6 is a view explanatory of a data formation of port data.

FIG. 6 is a diagram explanatory of one example of data form prepared, in the memory 12, 22 of each apparatus, for each of the plurality of input ports and/or the plurality of output ports provided by the apparatus. Each of the input ports provided by the I/O units 20a, 20b and the mixers 10a, 10b has an ID (p_ID) for identifying the each port, and the data prepared for the each port shown in FIG. 6 is also identified by the p_ID. Real port data 60 includes various parameters for controlling signal processing at a port corresponding thereto. Real port data 60 of an input port includes, for example, gain parameters which regulate amplification factors of audio signals of the port, phase control parameters which control whether phase inversion is made or not, etc. Patch data 61 is data which defines patching involving the port, and has values in accordance with a patch setting of the port set on the above-mentioned patch setting screen in FIGS. 3A, 3B and 3C. Patch data 61 of a port identified by a p_ID includes an ID (ch_ID) of a processing channel patched to the port or an ID (p_ID) of the port. On one hand, patch data 61 of an output port can store only one ch_ID or p_ID. On the other hand, patch data 61 of an input port can store a plurality of ch_IDs or p_IDs. The configuration to store real port data 60 per port in the memory 12 of each mixer 10 and in the memory 22 of each I/O unit 20 is equivalent to a first memory section configured to maintain, for each of the plurality of ports, real port data which is the parameters for controlling the signals. In the memory 12, 22 of each apparatus, further data per port which is information of audio transmission channels allocated to input ports, information of audio transmission channels as sources connected with output ports, etc. is stored as other data 62.

Values of real port data 60 of each port of each I/O unit 20 is set according to virtual port data 56 included in channel data 50 of a processing channel to which the port has been patched. Values of various parameters of real port data 60 of a port patched to a processing channel become equal to values of corresponding parameters in virtual port data 56 included in channel data 50 of the processing channel. Hereinafter, setting various parameters of real port data 60 and corresponding parameters in virtual port data 56 to be equal in value will be referred to as "to synchronize".

Figure 7:
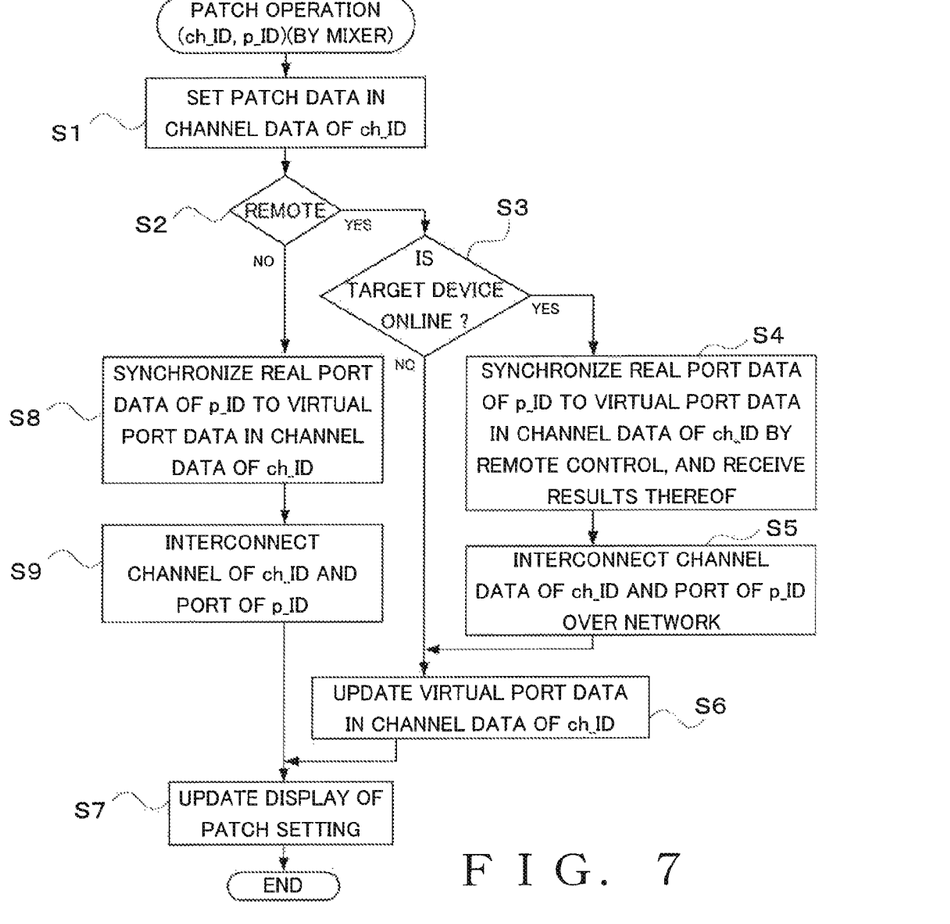
FIG. 7 is a flaw chart of a processing performed by a mixer in response to a patch operation.

In one embodiment, when a human operator (user) performs a patch setting operation which patches a processing channel and a port of the I/O unit 20 on the input patch setting screen 40 of FIG. 3A or on the output patch setting screen 43 of FIG. 3B, the mixer 10 synchronizes virtual port data 56 included in channel data 50 of the patched processing channel and real port data 60 of the patched port of the I/O unit 20. The mixer 10 displays a patch setting screen, for example, on the basis of patch data 57 in the memory 12 included in channel data 50 of each processing channel. FIG. 7 is a flaw chart showing a processing performed by the CPU 11 of the mixer 10 in response to a patch setting operation by a human operator. When a human operator performs a patch setting operation (connection instruction) for setting a connection between a processing channel and a port, a CPU 11 starts the processing shown in FIG. 7. In other words, a connection instruction is given in response to a patch setting operation by a user, and accordingly the processing shown in FIG. 7 starts. Note that any one source can be patched to each destination; and if the destination has been already patched, the present patch setting operation is to cancel the existing patch setting and replace it with a new patch setting. The following description will be based on the assumption that when performing the processing shown in FIG. 7, a value indicating an ID of a patch-set processing channel is stored in ch_ID variables, and a value indicating an ID of a patch-set port is stored in p_ID variables.

At step S1, the CPU 11 sets patch data 57 of channel data 50 of a processing channel identified by a ch_ID to a value of a p_ID, on the basis of the currently performed patch setting operation. At this time, the existing patch setting of the same destination is cancelled. Namely, on an occasion when a processing channel identified by a ch_ID is an input channel, if there is an existing ID in patch data 57 of the processing channel, the ID is overwritten by a value of a p_ID pertaining to a patch setting operation. On an occasion when a processing channel identified by a ch_ID is an output channel, if an ID number equal to a p_ID number is set to patch data 57 of another output channel, the ID number is deleted from the patch data 57 of the other output channel.

At step S2, on the basis of the value of the ID (p_ID) indicating the port currently patched to the processing channel, the CPU 11 examines whether the port (p_ID) is a remote port provided in the I/O unit 20 or another one than the mixer 10 or a local port provided in the mixer 10. If the port (p_ID) is a remote port (YES determination at step S2), the CPU 11 examines, at step S3, whether an apparatus (target device) including the port is online or not. The CPU 11 determines "online" if the target device is remotely controllable from the mixer 10 (or the target device is online), whereas it determines "not online" if the target device is remotely controllable from the mixer 10 (or the target device is offline) on the ground that the target device is unconnected with the network 30, or connected but the power source is off. As one example, the CPU 11 inquires about the online/offline state to the target device (e.g., about whether the target device is connected or not), and on the basis of a response to the inquiry, determines whether the target device is online or not.

If the target device is online (YES determination at step S3), the CPU 11 performs, at step S4, remote control for the target device, and real port data 60 of the port identified by the p_ID in the memory 22 of the target device is synchronized to virtual port data 56 included in channel data 50 of the processing channel identified by the ch_ID in the memory 12 of the mixer 10. The port of which the port data has been synchronized becomes able to be remote-controlled from the mixer system. The mixer 10 receives from the target device a change result (a result of the remote control for the above-mentioned synchronization) of the real port data 60, and thereafter the port pertaining to the patch setting operation is placed under control of the mixer 10. Note that, if an existing patch of an input port provided by any apparatus is cancelled at step S1, the input port of the apparatus is changed from online to offline and released from control of the mixer system.

At step S5, on the basis of the patch data 57 set at step S1, the CPU 11 remotely sets patch data 61 identified by the p_ID of the target device to a value of the ch_ID via the audio network 30. Thus, the processing channel identified by the ch_ID and the port identified by the p_ID are interconnected over the audio network 30.

If the processing channel identified by the ch_ID is an input channel, the port identified by the p_ID is normally an input port. In the target device, on the basis of the patch data 61 remotely set by the CPU 11 of the mixer 10, one audio transmission channel is allocated to an audio signal of the input port. The audio signal of the input port is transmitted to the audio network 30 from the target device, using the allocated audio transmission channel. In addition, the target device notifies transmit information indicative of the allocated audio transmission channel and the target device as the source thereof to other apparatuses of the audio network 30. On the basis of the transmit information and the patch data 57 notified by the target device, the mixer 10 identifies the audio transmission channel to which the audio signal of the input port identified by the p_ID thereof is transmitted, receives the audio signal in the identified audio transmission channel in the N_IO 13, and supplies, by the input patch section 100, the received audio signal to the input channel identified by the ch_ID.

On the other hand, if the processing channel identified by the ch_ID is an output channel, the mixer 10 allocates one audio transmission channel to an audio signal of the output channel. The mixer 10 transmits the audio signal of the output channel to the audio network 30 from the N_IO 13, using the allocated audio transmission channel. Also, the mixer 10 notifies transmit information indicative of the allocated audio transmission channel and the mixer as the source thereof to other apparatuses of the audio network 30. On the basis of the transmit information notified from the mixer 10 and the patch data 61 remotely set by the CPU 11 of the mixer 10, the target device identifies the audio transmission channel to which the audio signal of the output channel identified by the ch_ID, receives the audio signal of the identified audio transmission channel, and supplies the received audio signal to the output port identified by the p_ID.

Note that if the existing patch setting of the port provided by any apparatus is cancelled at step S1, the CPU 11 remotely controls, via the audio network 30, so as to delete or invalidate a value of a ch_ID of a processing channel pertaining to the patch setting from the patch data 61 of the port pertaining to the patch setting of the apparatus having the port. Thus, the connection between the port and the processing channel pertaining to the patch setting which has been realized prior to setting change is cancelled over the audio network 30.

At step S6, on the basis of the change result received at step S4, the CPU 11 updates, by local control, a value of the virtual port data 56 included in the channel data 50 identified by the ch_ID to a value set at a really-corresponding port. The change result received from the target device at step S4 (the value of real the port data 60 identified by the p_ID) is, if it has no error, equal to the value of the virtual port data 56 identified by the ch_ID stored in the memory 12, and normally there is no change in the value of the virtual port data 56. Finally, at step S7, the CPU 11 newly displays to indicate (with the above-mentioned mark "●" for example) a connection between the processing channel identified by the ch_ID and the port identified by the p_ID on the patch setting screen (FIG. 3A or FIG. 3B), as well as deleting an indication for the canceled connection, and then terminates the processing.

On the other hand, if the target device is offline (NO determination at step S3), because the target device or the real port data 60 corresponding to the virtual port data 56 of the channel data 50 identified by the ch_ID cannot be remotely controlled, the CPU 11 overpasses step S6 to newly display the connection between the processing channel of the ch_ID and the port of the p_ID on the patch setting screen, makes a warning indication that the port is offline, further deletes an indication for the cancelled connection (at step S7), and then terminates the processing.

Further, if the currently patched port (p_ID) is one provided in the mixer 10 (e.g., the input port 110a shown in FIG. 4) (NO determination at step S2), the CPU 11 sets, at step S8, the real port data 60 identified by the p_ID to a value of the virtual port data 56 of the channel data 50 identified by the ch_ID. As this real port data 60 is stored in the memory 12 of the mixer 10, this processing is performed by local control in the mixer 10. Thus, real port data 60 of a port patched to a processing channel is synchronized to virtual port data 56 included in channel data 50 of the processing channel, and thereafter the port is placed under control of the mixer 10.

At step S9, on the basis of the patch data 57 set at step S1, the CPU 11 locally controls its own patch section (the input patch section 100 or the output patch section 108), and sets the patch data 61 of the port identified by the p_ID to the value of the ch_ID, thereby connecting between the processing channel identified by the ch_ID and the port identified by the p_ID. In addition, if the existing patch setting of the port provided by the mixer 10 is canceled at step S1, local control is performed so as to delete or cancel the value of the ch_ID of the patch data 61 of the port, and then the connection pertaining to the canceled patch setting is cancelled. Then, the CPU 11 newly displays to indicate a connection between the processing channel identified by the ch_ID and the port identified by the p_ID on the patch setting screen, as well as deleting an indication for the cancelled connection (step S7), and then terminates the processing. Note that the ports provided in the mixer 10 shall be exclusively controlled among a plurality of mixing systems, and processing channels and patch-set ports in other mixing systems are placed under control of the other mixing systems.

The above description indicates: the configuration performing steps S1, S5, S9 using the CPU 11 functions as connecting between a selected one of the ports and a selected one of the processing channels in response to a given connection instruction. The configuration performing steps S4, S8 using the CPU 11 functions as setting, in response to the connection instruction, the port data of the selected port connected with the selected processing channel to a value of the virtual port data being maintained for the selected processing channel.

Figure 8:
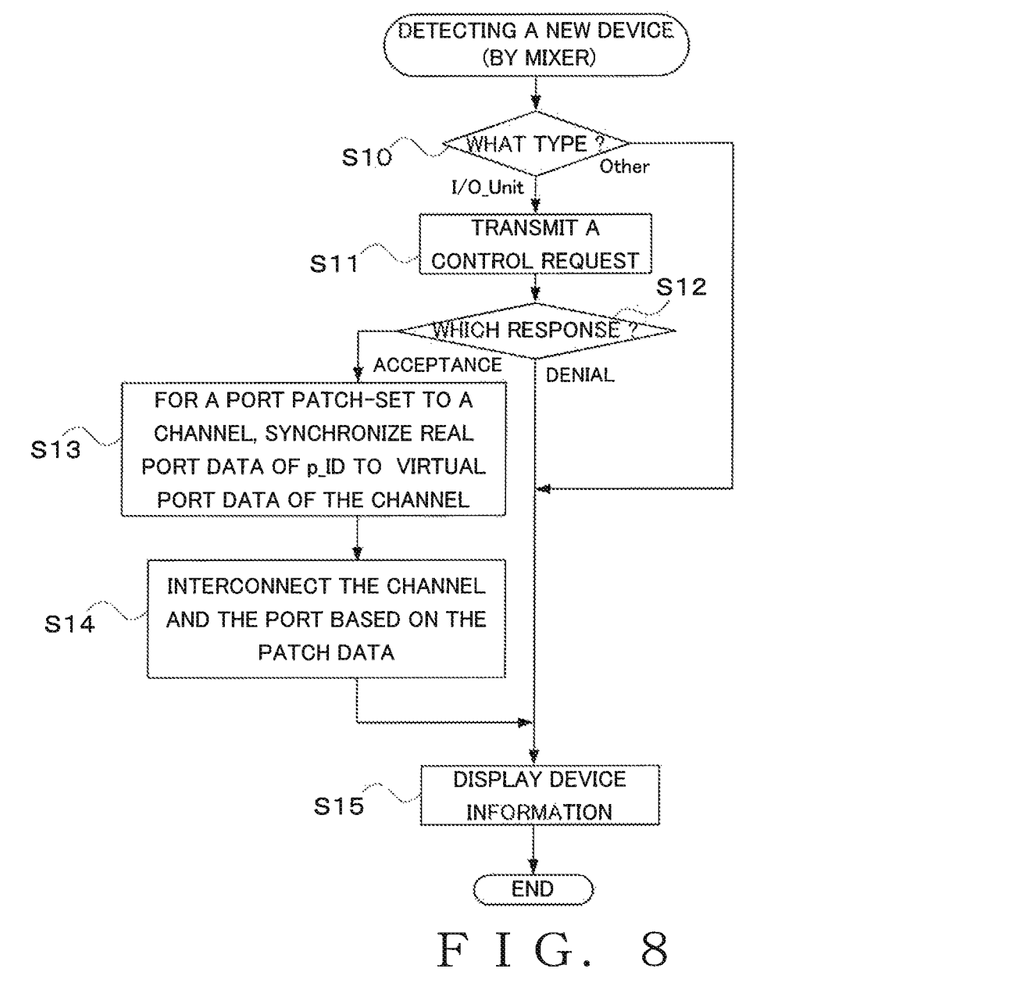
FIG. 8 is a flaw chart of a processing performed by a mixer when newly detecting an apparatus.

When newly finding an I/O unit 20 on the network 30, the mixer 10 synchronizes real port data 60 of a port of the newly found I/O unit 20 to virtual port data 56 of a processing channel, thereby allowing remote control from the mixer 10. Here, the port is that to which a connection with the processing channel is set in patch data 57 of the processing channel stored in the memory 12; and the virtual port data 56 is that of the processing channel. FIG. 8 is a flaw chart showing a processing which is performed when the mixer 10 newly detects any apparatus on the audio network 30. The processing of FIG. 8 is activated, for example, when a new I/O unit 20 is connected with the audio network 30, when a power source of an I/O unit 20 connected with the audio network 30 is turned on, or when the power source of the mixer 10 connected with the audio network 30 is turned on, etc.

At step S10, the CPU 11 of the mixer 10 examines the type of the newly detected apparatus. For example, the CPU 11 acquires information identifying the newly detected apparatus therefrom and examines the type of the apparatus on the basis of the information. As one example, the CPU 11 examines whether the apparatus is an I/O unit 20 or another type of apparatus. Note that the processing at step S10 may be configured not only to examine whether the apparatus is an I/O unit 20 or not, but also to examine whether the apparatus is equipment having input ports and/or output ports or not and further advance to step S11 if it is the equipment having input ports and/or output ports. If the newly detected apparatus is an I/O unit 20 ("I/O_Unit" at step S10), the mixer 10 transmits a control request to the newly detected I/O unit 20 at step S11. The control request requires the I/O unit 20 to receive remote control by the mixer 10. The I/O unit 20 which has received the control request makes a response of acceptance or denial of the control request to the mixer 10. For example, on an occasion when the I/O unit 20 cannot accept control from the mixer 10, such as the case that a version of a control program of the mixer 10, etc. is incompatible to the I/O unit 20, or the I/O unit 20 is set to accept only remote control from other mixer systems, the I/O unit 20 makes a response of denial (or makes no response). And, on an occasion when the I/O unit 20 can accept control from the mixer 10, the I/O unit 20 makes a response of acceptance.

At step S12, the mixer 10 receives a response to the control request from the I/O unit 20. If receiving the response of acceptance (determination result "acceptance" at step S12), on the basis of each patch data 57 included in all the channel data 50 of the mixer 10, the CPU 11 of the mixer 10 detects, at step S13, a port currently patch-set to any one of the processing channels of the mixer 10 from among the ports provided by the I/O unit 20. If detecting the currently patch-set port, the CPU 10 synchronizes port data, by remotely setting real port data 60 of the port of the I/O unit 20 to a value of virtual port data 56 included in channel data 50 of the processing channel. Thereafter, the port is placed under control of the mixer 10 to be online. Note that if a port to which the mixer 10 attempts to remotely set real port data 60 is set to be "occupied" by other mixer systems, the I/O unit 20 refuses the remote setting from the mixer 10, whereby the port remains offline seen from the mixer 10.

At step S14, the CPU 11 remotely sets patch data 61 of each port of the I/O unit 20 having become online at step S13 to a value of a ch_ID of the processing channel currently patch-set to the port. Thus, the processing channel and the port are interconnected over the audio network 30, allowing an audio signal to flow in between. At step S15, the CPU 11 displays information of a model name of the detected I/O unit 20, whether the apparatus (the I/O unit 20) has become online or not, whether each port has become online or not, etc. on the display section (UI 16), and then terminates the processing.

On the other hand, if the newly detected apparatus is another one than the I/O unit (determination result "Other" at step S10), the CPU 11 does not perform a series of the processing for the I/O unit 20 (while, needless to say, a series of processing for the newly detected apparatus may be performed), but displays information of the newly and currently detected apparatus on the display section (UI 16) (step S15), and then terminates the processing. Note that, step S15 can be omitted appropriately if various information does not need to be notified or displayed.

The above description indicates: the configuration performing step S14 by the CPU 11 functions as connecting between a selected one of the ports and a selected one of the processing channels in response to a given connection instruction. In other words, the configuration that the processing of FIG. 8 starts when the power source of the port or the processing channel is ON, or when a new port is found in the system is equivalent to giving connection instructions at those time points. In addition, the configuration performing step S13 by CPU 11 functions as setting, in response to the connection instruction, the real port data of the selected port connected with the selected processing channel to the value of the virtual port data being maintained for the selected processing channel.

Figure 9:
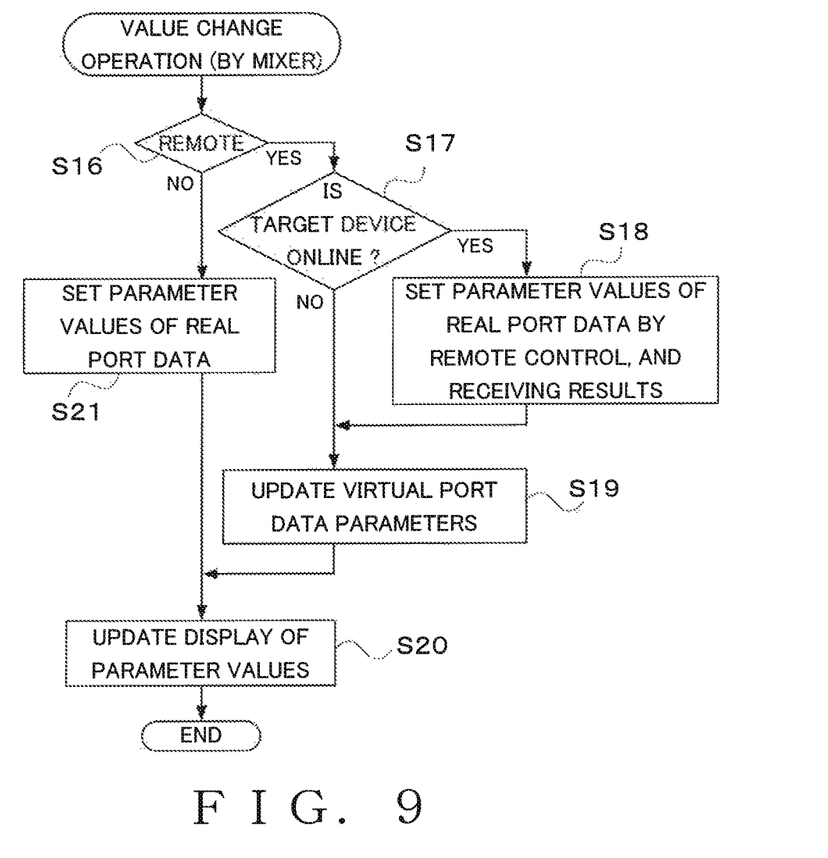
FIG. 9 is a flaw chart of a processing performed by a mixer in response to a value change operation.

FIG. 9 is a flaw chart illustrating a processing performed by the CPU 11 when a human operator performs, on the operation panel (UI 16) of the mixer 10, a value change operation (e.g., to move a knob, to push an electric switch, etc.) with a user interface to which parameters associated with ports is allocated. At step S16, the CPU 11 determines, on the basis of an ID (p_ID) identifying the port, whether the value change operation locally controls a value of the parameter of the port which belongs to another apparatus of the mixer 10 or remotely controls a value of the parameter of the port which belongs to another apparatus on the audio network 30. In this embodiment, a value of a parameter to be changed by remote control is assumed to be a value of a parameter of an I/O unit 20 on the network 30 or a value of a parameter in real port data 60 of another mixer 10. Note that from the channel setting screen (not shown in the figure) of a processing channel (i.e., a processing channel identified by a ch_ID) patched to any port (i.e., a port identified by a p_ID), a human operator can change a value of real port data 60 of the port (e.g., increase or decrease a gain value), which is not described in detail. The display or value change operation of the parameter associated with the port on the operation panel (UI 16) of the mixer 10 may be based on virtual port data 56 in the memory 12, or on real port data 60 in the memory 12 or in the memory 22.

If a value change operation is to remotely control (to remotely change values of real port data 60) (YES determination at step S16), both of a port identified by a p_ID and a target device (an I/O unit 20 or another mixer 10) including the port are online (YES determination at step S17), at step S18, the CPU 11 changes, by remote control, a value of one parameter of real port data 60, of the port identified by the p_ID, which is stored in the memory 12, 22 of the target device. The target device replies a change result (a changed value of the parameter) to the mixer 10. At step S19, on the basis of the replied change result, the CPU 11 updates a value of a corresponding parameter of virtual port data 56 in channel data 50 of a processing channel identified by a ch_ID to be equal in value to the replied change result which is the value of the parameter set to the real port data 60. Then, at step S20, on the basis of the updated result of the parameter value, the CPU 11 updates a value of a parameter indicated on the display section (UI 16), and then terminates the processing. Note that in the above-mentioned processing, a plurality of parameters may be changed in response to one value change operation.

In this way, if remotely controlling from the mixer 10 a parameter of real port data 60 of ports 210, 240 of an I/O unit 20 being online, both of the parameter of the real port data 60 on the I/O unit 20 side and a corresponding parameter of virtual port data 56 on the mixer 10 side are changed to a same value. Note that if a display or value change operation of a parameter associated with a port is performed on the operation panel (UI 16) of the mixer 10 on the basis of real port data 60, an updating processing to adjust the real port data 60 to a value of virtual port data 56 needs not necessarily be performed at the time of a value change operation, but may be performed at the time of a patch change operation of a processing channel after the value change operation and immediately before a patch change (at least before step S4 or S8 of FIG. 7).

Further, if a value change operation is to remotely control (to remotely change values of real port data) (YES determination at step S16) and either of a target device (an I/O unit 20 or another mixer 10) and a port identified by the p_ID is offline (NO determination at step S17), the CPU 11 changes, based on the value change operation, only a value of a corresponding parameter of virtual port data 56 in channel data 50 of a processing channel identified by a ch_ID (step S19), updates, on the basis of the updated result of the parameter value, a value of a parameter indicated on the display section (UI 16), and then terminates the processing.

On the other hand, if a value change operation is to be performed to one parameter of a processing channel or a port provided in the mixer 10 (NO determination at step S16), at step S21, the CPU 11 changes, on the basis of the value change operation, a value of a corresponding parameter in the memory 12 of the CPU 11, updates, on the basis of a result of the changed value, a value of a parameter indicated on the display section (UI 16) (step S20), and then terminates the processing. For example, if, on the channel setting screen of a processing channel identified by a ch_ID patched to a local port identified by a p_ID, a human operator operates to change a value of one parameter of the port, the CPU 11 changes both of the value of the parameter of real port data 60 of the port identified by the p_ID and virtual port data 56 included in channel data 50 of the processing channel identified by the ch_ID to a same value. Note that if, on the channel setting screen of the processing channel identified by the ch_ID, the human operator operates to change a value of one of various parameters 52-55 other than the parameter of the port, the CPU 11 changes the value of the parameter included in channel data 50 of the processing channel identified by the ch_ID. The above description indicates: the configuration that the CPU 11 starts the processing of FIG. 9 and performs step S18 or S21 functions as accepting, regarding a particular one of the ports being connected with any one of the processing channels, an operation to change values of the real port data of the particular port. Further, the configuration that the CPU 11 performs step S19 functions as, in response to the operation to change values of the real port data, updating values of the virtual port data for the processing channel connected with the particular port to values of the changed port data.

As is described above, the mixer system of this embodiment having the audio network 30 remotely or locally controls only real port data 60 of the ports 110, 140, 210, 240 connected with the own processing channels 102, 106, which are the ports 110, 140, 210, 240 being connected as sources or destinations of audio signals to be signal-processed in the mixer system, by synchronizing them to virtual port data 56 included in channel data 50 of the processing channels 102, 106. The ports 110, 140, 210, 240 unconnected with a signal processing of a mixer system are released from control of the mixer system and can be placed under control of other mixer systems.

Regarding ports being "shared" and unconnected with signal processing of any system among a plurality of ports 110, 140, 210, 240 provided in each apparatus, a direct interport connection peculiar to no mixer system can be set from the direct patch setting screen of FIG. 3C. If a human operator instructs a direct interport connection, the CPU 11 controls patch sections 100, 108, 120, 130, 220, 230 of a target device and realizes the direct interport connection. For example, if a direct patch setting is appointed from an input port of a particular apparatus identified by a p_ID at value id 1 to an output port of another apparatus identified by a p_ID at value id 2, the CPU 11 sets patch data 61 of the input port of the particular apparatus to value id 2 and sets patch data 61 of the output port of the other apparatus to value id 1. Thus, the particular apparatus allocates one of audio transmission channels being previously secured by the particular apparatus to an audio signal of the input port, transmits the audio signal using the audio transmission channel of the audio network 30, and notifies transmit information including the source of the audio signal and the audio transmission channel to other apparatuses of the audio network 30. The other apparatus identifies the audio transmission channel to receive the audio signal, on the basis of patch data 61 of an output port to which a direct connection is appointed and the notified transmit information, receives the audio signal of the audio transmission channel, and supplies the received audio signal to the output port to which the direct patch is appointed. In this manner, a connection is allowed so that an audio signal can directly flow from an input port of an apparatus via an output port of another apparatus via the network 30. Thus, the present invention allows the use of direct connection between two desired ports among a plurality of ports, irrespective of any mixer systems.

In addition, among a plurality of ports 110, 140, 210, 240 provided in each apparatus, ports which are "shared" and unconnected with a signal processing of a mixer system can be used for a signal processing using another mixer system. For example, among a plurality of ports 210a, 240a of an I/O unit 20a, ports which are unconnected with processing channels 102, 106 of the first mixer system can be connected with processing channels (not illustrated in the figure) of the second mixer system. In this case, on the basis of virtual port data 56 included in channel data 50 of the processing channels of the second mixer system, real port data 60 of the connected ports can be set. Therefore, the present invention allows the use that among a plurality of ports provided by each apparatus, some are used for a signal processing of a system, and some others are used for a signal processing of another system.

Therefore, the mixer system of this embodiment can reduce restriction on port use and improve usability.

In addition, as virtual port data 56 is prepared for a port patched to a processing channel, the present invention also has a superior effect to be able to reduce port data in total if ports exceed processing channels in number.

As is already described, one source (an input port, an output channel, etc.) is connectable with a plurality of destinations (input channels, output ports, etc.). For example, one input port patched to an input channel of a mixer system can be further patched to another input channel of the same mixer system. In this case, virtual port data 56 included in channel data 50 is controlled to become equal in value among the plurality of input channels patched to the same input port. For example, virtual port data 56 of a later patched input channel is adjusted in value to virtual port data 56 of an earlier patched input channel, whereby virtual port data 56 of one of the input channels is adjusted to virtual port data 56 of another one of the input channels (first-come priority). Thus, a parameter of one input port is configured to be controlled from any one of a plurality of input channels connected with this input port. Note that an algorithm for equalizing values of virtual port data of the plurality of channels patched to the same port may be not only the above-mentioned first-come priority, but also later-come priority (i.e., giving priority to virtual port data of a later patched channel), averaging (i.e., setting a mean value of virtual port data of earlier and later patched channels as a new virtual port data), etc. To sum up, a modification of synchronization of real port data performed at steps S4, S8, S13 includes: when one of the input ports is connected with two or more processing channels, changing two or more values of virtual port data maintained in the two or more processing channels to a common value and setting real port data for the one input port to the common value.

Note that if a human operator performs a setting operation to patch one input port to a plurality of input channels, after obtaining approval of the human operator, the CPU 11 should synchronize virtual port data 56 between the plurality of input channels. Further, if synchronization of the virtual port data 56 is not approved, the CPU 11 may, for example, be adapted to cancel a later performed patch setting.

The CPU may also be configured to patch one input port patched to an input channel of a mixer system to an input channel of another mixer system or an output port outside the mixer system; provided, in this case, real port data 60 of the one input port is under control of the mixer system. Therefore, the other mixer system can receive an audio signal from the one input port, but cannot place the input port under control. Such patching is referred to as monitoring patching, to be distinguished from normal patching. Further, each mixer system may be configured so that a human operator can set per input port whether to permit the monitoring patching from other mixer systems or not.

Note that the output patch section 108 of the mixer 10 may be configured to patch one output channel 106 to a plurality of output ports 140, 240. In that case, as channel data 50 of the output channel 106, virtual port data 56 and patch data 57 should be prepared for the plurality of ports, allowing to set and remotely control real port data 60 per patched port independently.

Note that a digital signal processing on an audio signal performed by the mixer system may be not only a mixing processing as shown in FIG. 4, but also any kinds of digital signal processing such as property control processing, analysis processing, reverberation providing processing, etc. on a digital signal.

Note that apparatuses constructing a mixer system should have at least an input/output function of audio signals, a signal processing function and a controlling function, the last of which controls the former two functions in response to a human operator's operation, but are not limited to the configuration shown in FIG. 1 that the mixer 10 and the I/O unit 20 are interconnected. For example, while the mixer 10 shown in FIG. 1 includes both the UI 16 and the DSP 15, it may be constructed as a plurality of separated apparatuses such as a console provided with the UI 16 and an engine provided with the DSP 15, each of which is connected with the audio network 30. Alternatively, the console and the engine may be interconnected using a special circuit other than the audio network 30, with which only the engine may be connected. Or, each of the apparatuses or the audio network 30 included in the mixer system may be structured on a virtual machine or a virtual network realized on a cloud or a computer.

In addition, instead of the UI 16 or the console of the mixer 10, a personal computer, etc. which execute software programs for remote control may be adapted to behave as a control system for controlling functions to input/output audio signals and perform signal processing thereon in response to a human operator's operation. The personal computer, etc. may be a mobile terminal such as a handheld unit (e.g., tablet terminal and smartphone) or the above-mentioned virtual machine, regardless of their forms. Alternatively, the present invention is applicable not only to the mixer 10, the above-mentioned personal computer, etc., but also to any apparatus constructing a mixer system. And such mixer system may be realized not only in a single apparatus, but also share such roles among a plurality of apparatuses as storing channel data and virtual port data in an apparatus and performing connection settings in other apparatuses.

It should be appreciated that the present invention is applicable not only to an audio mixer which performs mixing processing on audio signals, but also to a video mixer which performs mixing processing on video signals.

This application is based on, and claims priority to, JP PA 2013-205336 filed on 30 Sep. 2013. The disclosure of the priority application, in its entirety, including the drawings, claims, and the specification thereof, are incorporated herein by reference.

What is claimed is:

1. A computer-implemented method for managing a plurality of ports in a first mixer system, the first mixer system comprising: the plurality of ports each configured to input a signal or output a signal and to process the signal according to a parameter; and a plurality of processing channels each configured to process a signal, the method comprising:
    a step of maintaining, for each of the plurality of ports, real port data which includes a parameter for processing the signal;
    a step of maintaining, for each of the plurality of processing channels, virtual port data which includes a parameter for a port of the plurality of ports to be connected with the processing channel;
    a step of connecting, in response to a given connection instruction, between a selected one of the plurality of ports and a selected one of the plurality of processing channels;
    a step of setting, in response to the given connection instruction, a value of the real port data maintained for the selected port connected with the selected processing channel to a value of the virtual port data maintained for the selected processing channel;
    a step of accepting an operation to change a value of the real port data maintained for the selected port;
    a step of placing the selected port under control of the first mixer system; and
    a step of releasing a port unconnected with the selected processing channel from control of the first mixer system.

2. The method of claim 1, further comprising:
    in response to the operation to change a value of the real port data, updating a value of the virtual port data for the processing channel being connected with the selected port to a value of the real port data.

3. The method of claim 1, wherein the given connection instruction is given when a power source of a port or a processing channel is turned ON.

4. The method of claim 1, wherein the given connection instruction is given when a new port is found in the system.

5. The method of claim 1, wherein the given connection instruction is given in response to a user's operation.

6. The method of claim 1, wherein at least one of the plurality of ports communicates with at least one of the plurality of processing channels via a network.

7. The method of claim 1, wherein at least one of the plurality of ports is included in an input or output unit configured to communicate with at least one of the plurality of processing channels via a network.

8. The method of claim 1, wherein at least one of the plurality of ports is included in a second mixer system configured to communicate with at least one of the plurality of processing channels via a network.

9. The method of claim 1, wherein the selected port is an input port to be connected with two or more processing channels, and the step of setting comprises:
    setting two or more values of the virtual port data maintained for the two or more processing channels to a common value; and
    setting a value of the real port data maintained for the selected port to the common value.

10. The method of claim 1, wherein the number of the plurality of ports is greater than the number of the plurality of processing channels.

11. A non-transitory computer-readable storage medium containing instructions executable by a computer to perform a method for managing a plurality of ports in a mixer system, the mixer system comprising: the plurality of ports each configured to input a signal or output a signal and to process the signal according to a parameter; and a plurality of processing channels each configured to process a signal, the method comprising:
    a step of maintaining, for each of the plurality of ports, real port data which includes a parameter for processing the signal;
    a step of maintaining, for each of the plurality of processing channels, virtual port data which includes a parameter for a port of the plurality of ports to be connected with the processing channel;
    a step of connecting, in response to a given connection instruction, between a selected one of the plurality of ports and a selected one of the plurality of processing channels;
    a step of setting, in response to the given connection instruction, a value of the real port data maintained for the selected port connected with the selected processing channel to a value of the virtual port data maintained for the selected processing channel;
    a step of accepting an operation to change a value of the real port data maintained for the selected ports;
    a step of placing the selected port under control of the first mixer system; and
    a step of releasing a port unconnected with the selected processing channel from control of the first mixer system.

12. A first mixer system comprising:
    a plurality of ports each configured to input a signal or output a signal and to process the signal according to a parameter;
    a plurality of processing channels each configured to process a signal;
    a first storage configured to maintain, for each of the plurality of ports, real port data which includes a parameter for processing the signal;
    a second storage configured to maintain, for each of the plurality of processing channels, virtual port data which includes a parameter for a port of the plurality of ports to be connected with the processing channel; and
    a processor configured to:
        connect, in response to a given connection instruction, between a selected one of the plurality of ports and a selected one of the plurality of processing channels;
        set, in response to the given connection instruction, a value of the real port data maintained for the selected port connected with the selected processing channel to a value of the virtual port data maintained for the selected processing channel;
        accept an operation to change a value of the real port data maintained for the selected port;
        place the selected port under control of the first mixer system; and
        release a port unconnected with the selected processing channel from control of the first mixer system.

13. The mixer system of claim 12, wherein the processor is further configured to, in response to the operation to change a value of the real port data, update a value of the virtual port data for the processing channel being connected with the selected port to a value of the real port data.

14. The mixer system of claim 12, wherein at least one of the plurality of ports communicates with at least one of the plurality of processing channels via a network.

15. The mixer system of claim 12, wherein at least one of the plurality of ports is included in an input or output unit configured to communicate with at least one of the plurality of processing channels via a network.

16. The mixer system of claim 12, wherein at least one of the plurality of ports is included in a second mixer system configured to communicate with at least one of the plurality of processing channels via a network.

17. The mixer system of claim 12, wherein the selected port is an input port to be connected with two or more processing channels, and wherein the processor is further configured to:
  set two or more values of the virtual port data maintained for the two or more processing channels to a common value; and
  set a value of the real port data maintained for the selected port to the common value.

* * * * *